(12) United States Patent
Legler (10) Patent No.: US 10,204,133 B2
(45) Date of Patent: *Feb. 12, 2019

(54) OPTIMIZING UPDATE OPERATIONS IN IN-MEMORY DATABASE SYSTEMS

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 50 days.

This patent is subject to a terminal disclaimer.

(21) Appl. No.: 15/401,678

(22) Filed: Jan. 9, 2017

(65) Prior Publication Data

US 2017/0116258 A1 Apr. 27, 2017

Related U.S. Application Data

(63) Continuation of application No. 14/244,161, filed on Apr. 3, 2014.

(51) Int. Cl.
G06F 17/30 (2006.01)
(52) U.S. Cl.
CPC .. *G06F 17/30377* (2013.01); *G06F 17/30339* (2013.01)
(58) Field of Classification Search
None
See application file for complete search history.

(56) References Cited

U.S. PATENT DOCUMENTS

| 8,195,643 B2 | 6/2012 | Weyerhaeuser et al. |
| 2009/0292711 A1* | 11/2009 | Konik ................ G06F 17/3051 |
| 2010/0281005 A1* | 11/2010 | Carlin ............... G06F 17/30312 |
| | | 707/696 |
| 2012/0221549 A1 | 8/2012 | Weyerhaeuser et al. |

* cited by examiner

*Primary Examiner* — Tuan-Khanh Phan
(74) *Attorney, Agent, or Firm* — Fish & Richardson P.C.

(57) ABSTRACT

Performing optimized update operations in in-memory database systems. Update values corresponding to a source table of values stored on an in-memory database are identified by an in-memory database computer system based on information from a computer system implementing a software application. The update values are distributed across a plurality of rows, each row including a plurality of column attributes. At least some column attributes of the plurality of column attributes include values updated relative to corresponding column attributes in the source table of values. A row of the update values is identified. The row includes a plurality of column attributes, each column attribute having a respective value. Each value of each column attribute of the row of the update values is the same as a corresponding value of a corresponding attribute of a corresponding row of the source table is determined. Upon such a determination, a corresponding row of the source table stored on the in-memory database is written into the in-memory database by the in-memory database computer system.

16 Claims, 5 Drawing Sheets

OPTIMIZING UPDATE OPERATIONS IN IN-MEMORY DATABASE SYSTEMS

CLAIM OF PRIORITY

This application is a continuation of and claims the benefit of priority to U.S. patent application Ser. No. 14/244,161, filed Apr. 3, 2014, the contents of which are hereby incorporated by reference.

TECHNICAL FIELD

This disclosure relates to computer-implemented methods, computer systems and computer-readable media implemented in in-memory database systems.

BACKGROUND

An in-memory database system is a database management system that uses main memory for computer data storage. In-memory database systems can store data objects in column-oriented or row-oriented fashion. Various data compression techniques can be used for storage size optimization. For example, dictionary compression or encoding can be used for data compression, especially for column-oriented database. Data can be read, written, updated, deleted, or otherwise managed by the in-memory database systems.

SUMMARY

This disclosure relates to computer-implemented methods, software, and systems for optimizing update operations in in-memory database systems. One computer-implemented method includes identifying, by an in-memory database computer system based on information from a computer system implementing a software application, update values corresponding to a source table of values stored on an in-memory database, the update values distributed across a plurality of rows, each row including a plurality of column attributes, at least some column attributes of the plurality of column attributes including values updated relative to corresponding column attributes in the source table of values; identifying, by the in-memory database computer system, a row of the update values, the row including a plurality of column attributes, each column attribute having a respective value; determining, by the in-memory database computer system, that each value of each column attribute of the row of the update values is the same as a corresponding value of a corresponding attribute of a corresponding row of the source table; and writing, by the in-memory database computer system, a corresponding row of the source table stored on the in-memory database into the in-memory database, in response to determining that each value of each column attribute of the row of the update values is the same as the corresponding value of the corresponding attribute of the corresponding row of the source table.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, wherein writing the corresponding row of the source table to the in-memory database comprises performing optimized update operations, the optimized update operations comprising: determining a dictionary compressed identifier of each value of each column attribute of the row of the update values to be the same as a dictionary compressed identifier of the corresponding value of the corresponding attribute of the corresponding row of the source table; generating a new row that includes the dictionary compressed identifier of each value of each column attribute in the corresponding row of the source table; and inserting the new row into a delta table of the in-memory database.

A second aspect, combinable with the general implementation, further comprising, in response to determining that each value of each column attribute of the row of the update values is the same as the corresponding value of the corresponding attribute of the corresponding row of the source table, increasing a likelihood for performing the optimized update operation.

A third aspect, combinable with the general implementation, wherein the row of the update values is a first row of the update values and the corresponding row in the source table is a corresponding first row in the source table, and wherein the method further comprises: determining that a value of a column attribute of a second row of the update values is different from a corresponding value of a corresponding attribute of a corresponding second row of the source table; and in response to determining that the value of the column attribute of the second row of the update values is different from the corresponding value of the corresponding attribute of the corresponding second row of the source table, decreasing a likelihood for performing the optimized update operation.

A fourth aspect, combinable with the general implementation, wherein the method further comprises, for each of a threshold number of rows of the update values, the threshold number being less than a total number of rows of the update values: determining that a value of a column attribute of a respective row of the update values is different from a corresponding value of a corresponding attribute of a corresponding respective row of the source table; and in response to determining that the value of the column attribute of the respective row of the update values is different from the corresponding value of the corresponding attribute of the corresponding respective row of the source table, determining that the update values do not qualify for performing the optimized update operation.

A fifth aspect, combinable with the general implementation, further comprising, in response to determining that the update values do not qualify for performing the optimized update operation: performing dictionary compression or lookup to identify a dictionary compressed identifier of each value of each column attribute of the row of the update values; generating a new row that includes the dictionary compressed identifier of each value of each column attribute; and inserting the new row into a delta table of the in-memory database.

A sixth aspect, combinable with the general implementation, wherein the threshold number of rows is five rows.

A seventh aspect, combinable with the general implementation, further comprising determining that the update values qualify for the optimized update operation, wherein determining that the update values qualify for the optimized update operations comprises: identifying a first number of column attributes of the update values that include values updated relative to the corresponding column attributes in the source table of values; identifying a second total number of column attributes in the source table; determining that the first number satisfies a first threshold number of column attributes; and determining that a difference between the second number and the first number satisfies a second threshold difference in a number of column attributes.

A eighth aspect, combinable with the general implementation, wherein writing the corresponding row of the source table to the in-memory database comprises writing the corresponding row of the source table to the in-memory database instead of performing dictionary compression or lookup of each value of each column attribute of the row of the update values.

A ninth aspect, combinable with the general implementation, further comprising: identifying a first number of column attributes of the update values that include values updated relative to the corresponding column attributes in the source table of values; identifying a second total number of column attributes in the source table; determining that the first number satisfies a first threshold number of column attributes; determining that a difference between the second number and the first number satisfies a second threshold difference in a number of column attributes; performing an attribute-by-attribute comparison of a column attribute of a row of the update values with a corresponding column attribute of a corresponding row in the source table, in response to determining that the first number satisfies the first threshold and that the difference satisfies the second threshold difference; and writing dictionary compressed identifiers of the updated values to the in-memory database based on the attribute-by-attribute comparison.

While generally described as computer-implemented software embodied on tangible media that processes and transforms the respective data, some or all of the aspects can be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

This disclosure describes computer-implemented methods, computer-readable media, and computer systems for optimizing update operations in in-memory database systems. In some implementations, a software application layer (e.g., an enterprise resource planning (ERP) layer) can retrieve a table of values, for example, from a source table stored in an in-memory database, update some of the values in the source table, and return the update values (e.g., an update table) to the in-memory database. In some implementations, the in-memory database system can perform an insert operation to update the source table with the update values. For example, for each row of the update table, the in-memory database system can create a new row that includes corresponding update values and store the new row into the in-memory database. To do so, the in-memory database system can execute dictionary compression to convert a value in the update table into an identifier (e.g., smaller relative to a size of the value, thus requiring less storage resource than the value), include the identifier in the new row, insert the new row into, for example, a delta table other than the source table in the in-memory database, and delete the corresponding row in the source table. Sometimes, the ERP layer does not update many values. In such cases, implementing a dictionary compression can be resource intensive. This technology provides an optimized mechanism for the update operations of in-memory database systems.

In some implementations, the in-memory database system can check if the update table is a candidate for the optimized update operation. For example, the in-memory database system can check whether the number of columns in the update table satisfies a threshold number (e.g., a predetermined threshold number of columns). The in-memory database system can also check if the number of columns in the update table is very close to (e.g., no less than 90% of) the total number of columns of the source table. If both checks are positive, the in-memory database system can determine that the update table is a good candidate for the optimized update process. If one or both of the checks fail, the in-memory database system can determine that the update table is a not good candidate for the optimized update process and proceed to perform regular or normal update operations to update the source table, i.e., the dictionary compression-based update operation.

In response to determining that the update table is a candidate for the optimized update process, the system can update the source table as described below. For a first row of the update table, the in-memory database system compares each column in the first row with a corresponding column in the source table to determine if the value has been changed. If the values are equal (e.g., because the software application layer has not changed the value retrieved from the source table), then the in-memory database system increases the probability that the optimized update operations can be performed on the update table. The in-memory database system can compare a threshold number of rows (e.g. 5 rows). If the values in the threshold number of rows of the update table remains the same as those in the source table, the in-memory database system can determine that the update table qualifies for the optimized update operations and hence perform the optimized update operations, for example, by generating a new row of each row of the update table, copying the dictionary compressed identifier (ID) from the old row in the source table into the new row, and insert the new row into the delta table of the in-memory database. By copying the dictionary compressed ID, the in-memory database system skips the computationally expensive dictionary compression step. The optimized update operations help reduce computational load, improve execution speed, and enhance efficiency of an in-memory database system. In some implementations, column attributes that are eligible for the optimized update operations can be removed from the Log-Entry of certain update. This can significantly reduce the size of the log and improve the performance of a log replay. The optimized update operations can help achieve additional or different advantages, for example, less cache pollution, less traffic on memory controller, better success chance for transactional memory, less non-uniform memory access (NUMA) effects, less context switches, etc.

In some instances, if the values of a row of the update table are not equal to the corresponding values in the source table (e.g., because the software application layer has not changed the value retrieved from the source table), then the in-memory database system decreases the probability that the optimized update operations can be performed. If the probability falls below a threshold after several rows of comparisons or tests, the in-memory database system can determine that the update table does not qualify for the optimized update operations and hence perform the normal update operations that include dictionary compressions of the update values.

Figure 1:
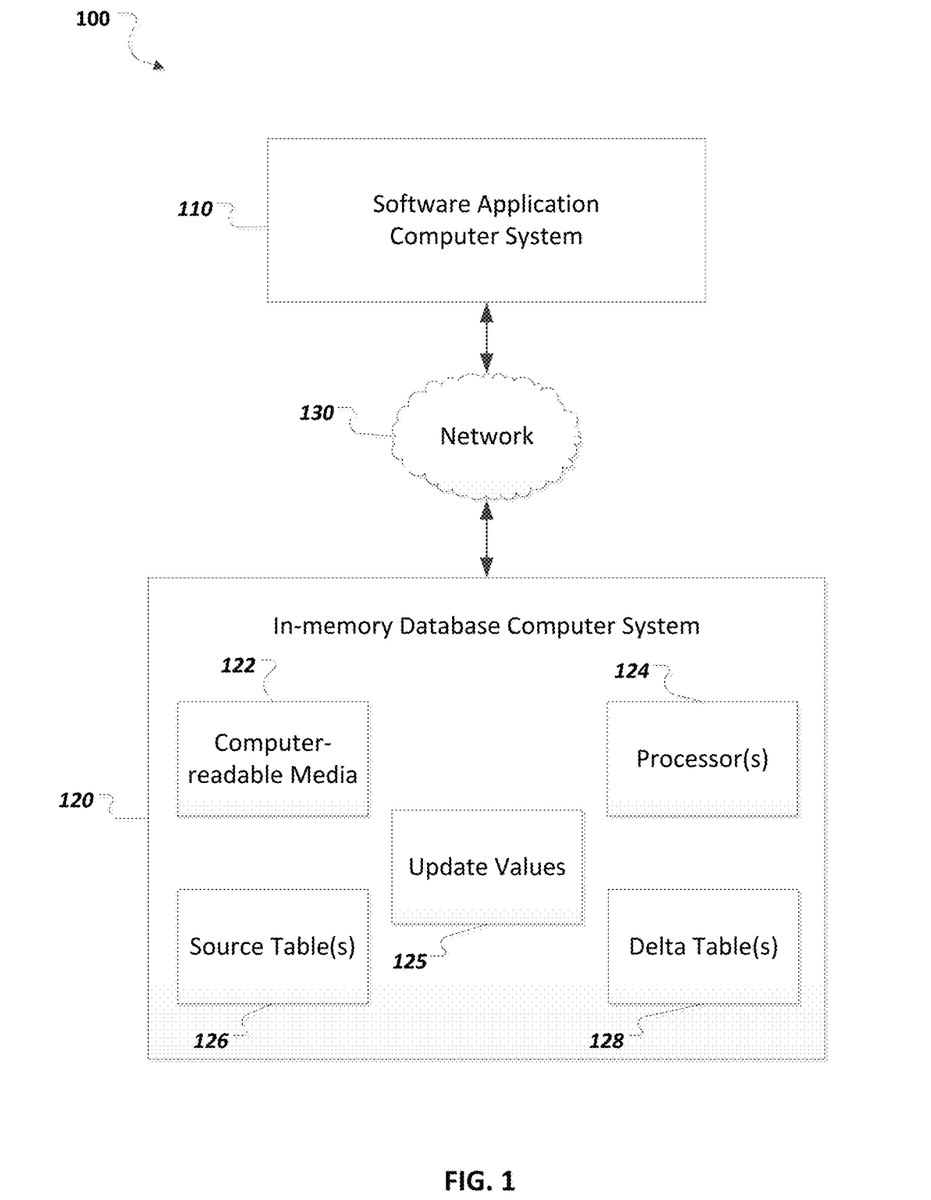
FIG. 1 is a block diagram illustrating an example distributed computing system operable to perform optimized update operations in in-memory database systems.

FIG. 1 is a block diagram illustrating an example distributed computing system 100 operable to perform optimized update operations in in-memory database systems. The illustrated computing environment 100 includes a software application computer system 110 and an in-memory database computer system 120 communicably coupled through a network 130 (e.g., wired or wireless network, the Internet, another communication network, or combinations of them). Each of the systems 110 and 120 can include more than one system and/or more than one computing device (e.g., computer, laptop, server, mobile device, and otherwise) within a distributed computing environment. The systems 110 and 120 can be directly coupled to each other, or can be implemented as integral parts of a single system. The communications and interactions between the software application computer system 110 and the in-memory database computer system 120 can be direct or through the network 130.

The software application computer system 110 can be an electronic computing device (e.g., one or more servers or computers) operable to perform functions associated with creation, modification, and execution of software applications. The software application computer system 110 can be operable to receive, transmit, process, store, or manage data and information associated with the software applications. For instance, the software application computer system 110 can interact with the in-memory database computer system 120 to access, modify, update, or otherwise manipulate data stored in the in-memory database computer system 120. In some instances, the software application computer system 110 can be an enterprise resource planning (ERP) system or another business intelligence system.

The in-memory database computer system 120 can be implemented as an in-memory database management system (e.g., including one or more servers or computers) used for analytical processing, searching, planning, simulations, or other functionalities. As illustrated, the in-memory database computer system 120 includes one or more processors 124 and computer-readable media 122 for performing functions including read, write, insert, update, delete, sort, search, query, compress, organize, analyze, or any other appropriate data management operations. In some implementations, the in-memory database computer system 120 can provide infrastructure and tools for building high-performance applications. The in-memory database computer system 120 can include, for example, relational database management system and support structured query language (SQL) for data access control, schema creation and modification, real-time analysis of large volumes of data, and any other appropriate data operations. The in-memory database computer system 120 can include or interface with additional or different components or modules as appropriate.

The in-memory database computer system 120 can store data tables in columns (i.e., column-oriented storage), in rows (i.e., row-oriented storage), or both. Compression algorithms can be used to help to keep all relevant application data in memory. For instance, the in-memory database computer system 120 can implement column-oriented storage and perform dictionary compression (or encoding) to compress the data. Compressed data can be loaded faster into the CPU cache. With dictionary compression, each data value has a dictionary compressed ID. As such, the columns of data are stored as arrays of, for example, bit encoded integers. Sorting, comparing, searching can be executed on the integers, which can be faster than operating directly on the data values (e.g., for example floating value, string values, etc.). The in-memory database computer system 120 can create a respective dictionary for each column of a table, or multiple columns of a table can share the same dictionary.

In some implementations, the in-memory database computer system 120 can store data in two physical table parts: old data in source table(s) 125 (known, in some implementations, as main storage or main part) and new data in delta table(s) 128 (known, in some implementations, as delta storage or delta part). In some implementations, the in-memory database computer system 120 does not directly modify the old data in the source table(s) 126. Instead, the in-memory database computer system 120 writes all changes into the separate delta table. For example, the in-memory database computer system 120 inserts a new row into the delta table(s) 128 and deletes the old row in the source table(s) 126.

In one example operation, the software application computer system 110 can send a request, command, or instruction (e.g., a structured query language (SQL) query) to the in-memory database computer system 120, for example, to read data into an application. In some implementations, the software application computer system 110 can read complete rows of a source data file or table from the in-memory database and each row can include up to hundreds or thousands of columns. The software application computer system 110 can change some (or none) of the entries in the loaded data, and send full rows of data back to the in-memory database computer system 120 as update values.

Upon receiving the update values (e.g., update values 125), the in-memory database computer system 120 can determine if the update values 125 qualify for optimized update operations. If not, the in-memory database computer system 120 can parse each value in each row of the update values, apply dictionary compression of each value in each row, and insert a new row that includes the dictionary compressed ID of each value into a delta table 128 of the in-memory database computer system 120. If the update values 125 are determined to qualify for optimized update operations, the in-memory database computer system 120 can implement the optimized update operations that skip the computationally intensive dictionary compression operations, thus enhancing the speed and performance of the in-memory database computer system 120.

Figure 2:
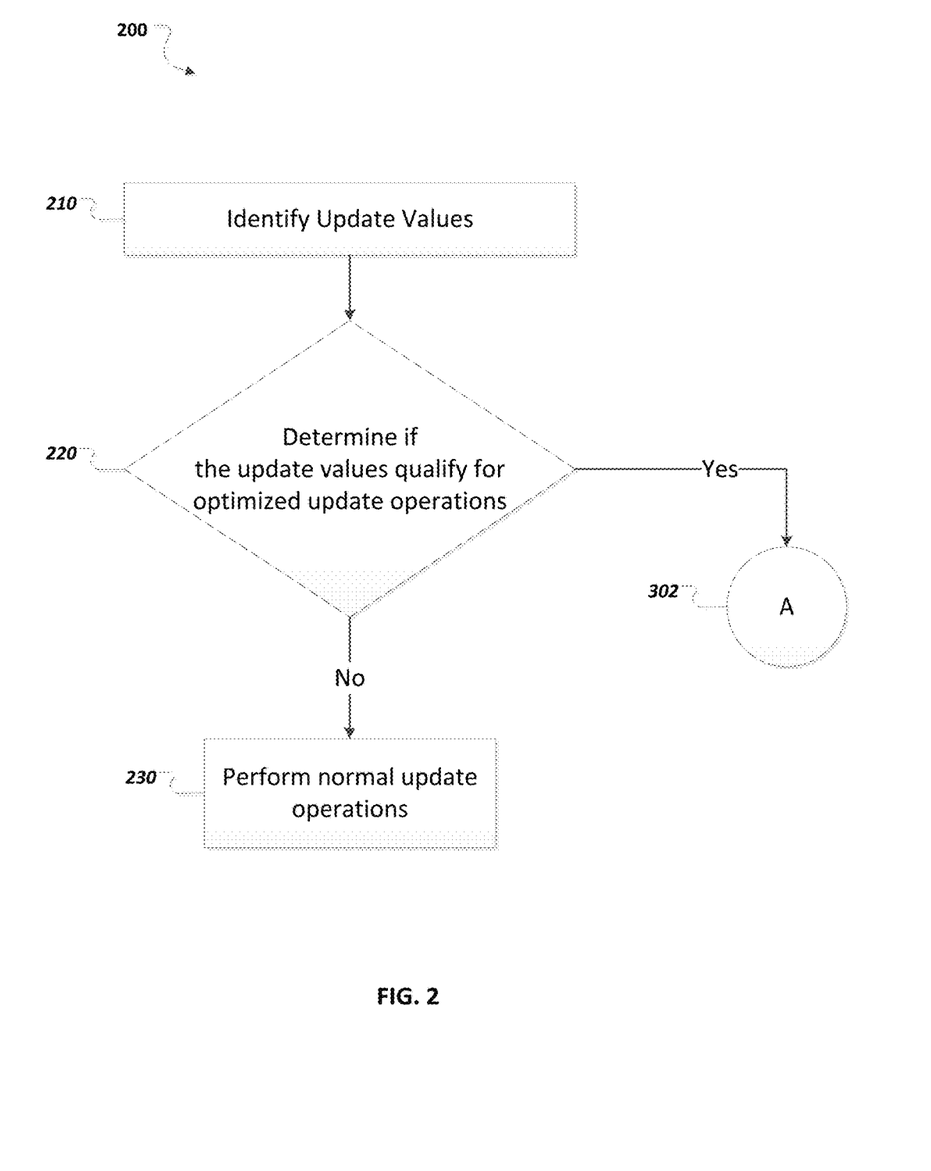
FIG. 2 is a flow chart illustrating an example method for determining a candidate for optimized update operations in in-memory database systems.

FIG. 2 is a flowchart of an example process 200 for determining a candidate for performing optimized update operations. The process 200 can be implemented as computer instructions stored on computer-readable media (for example, the computer-readable medium 122) and executable by data processing apparatus (for example, processor(s) 124). For example, the process 200 can be implemented by the in-memory database computer system 120, or another computer system.

At 210, update values are identified. For example, an in-memory database computer system (e.g., the in-memory database computer system 120) can identify the update values (e.g., update values 125). The update values can correspond to a source table of values (e.g., the source table 126) stored on an in-memory database. The in-memory database computer system can identify the update values' corresponding source table of values, for example, based on the table part (e.g., source table or delta table), row number, or any other information. In some implementations, the update values are distributed across multiple rows, each row including multiple column attributes. For example, the update values can be an update table that includes a number of columns and rows. In some implementations, the update values can be identified by receiving the update values directly from a computer system implementing a software application (e.g. the software application computer system 110), or the update values can be generated, determined, or otherwise identified by the in-memory database computer system based on information (e.g., an SQL query, update request, write/insert operation, etc.) received from the computer system implementing a software application. For instance, the update values can be determined based on an update statement sent from a software application computer system upon a user input, an automatic system update, etc. The update statement can explicitly define or otherwise identify one or more column attributes to be updated to certain assigned values. As such, the update values can be determined to include all the identified column attributes and their corresponding assigned values. In some instances, one or more of the identified column attributes includes "real updates," in which case, the assigned values are different from the corresponding values in the source table. In some instances, one or more of the identified column attributes includes "nominal updates," in which case, the assigned values are the same as the original values in the source table (i.e., the values of the column attributes are not changed).

Figure 5:
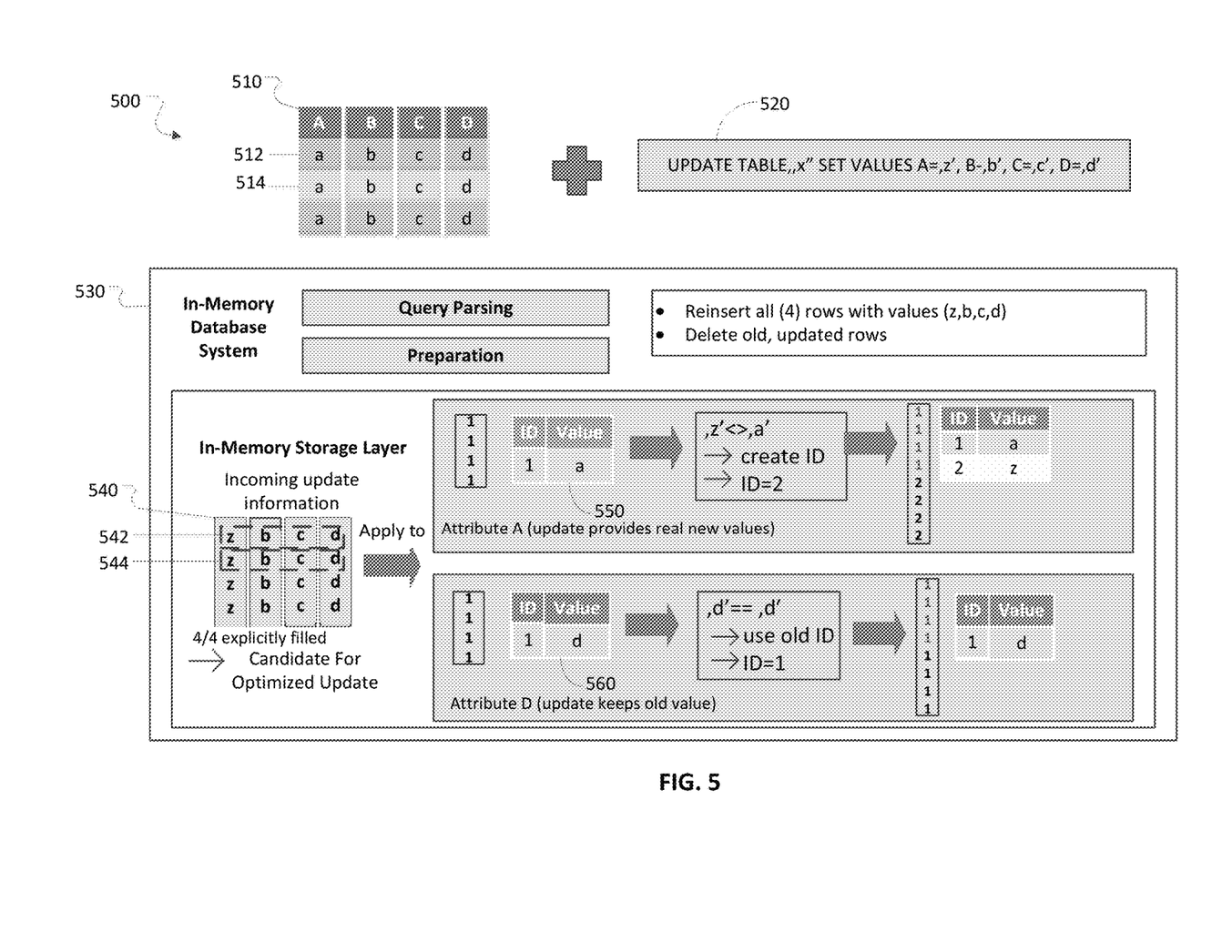
FIG. 5 illustrates an example implementation of the optimized update operations in in-memory database systems.

FIG. 5 illustrates examples of update values and the corresponding source table. The example source table 510 includes four rows and each row includes four column attributes A, B, C, and D. Although in the example source table 510 each columns attribute have the same values across all rows, i.e., "A=a, B=b, C=c, and D=d" for all four rows, the values for each column attribute can be different. The in-memory database computer system 530 in FIG. 5 can receive an update statement or query 520 (e.g., from a software application computer system) to set the values of the column attributes to "A=a, B=b, C=c, and D=d." The in-memory database computer system 530 can parse the query and make appropriate preparations for the update. For example, the in-memory database computer system 530 can determine that all the four column attributes A, B, C, and D are explicitly identified in the update statement 520. The in-memory database computer system 530 can prepare the updated values 540 to include all four column attributes with explicitly assigned values (z, b, c, d) for each of the rows. In this case, among the four column attributes in the update values 540, only the column attribute A includes "real updates" where the values of column attribute "A" are changed to "z" from the corresponding original values "a" in the source table 510. The other three column attributes B, C, and D include "nominal updates" where the values of these column attributes are the same as those in the source table 510.

Returning to FIG. 2, at 220, a check can be performed to determine whether the update values (e.g., the update values 125 and 540 in FIGS. 1 and 5, respectively) qualify for optimized update operation. For example, the in-memory database computer system can perform the check. To do so, the in-memory database computer system can identify a first number of column attributes of the update values that include values updated relative to the corresponding column attributes in the source table of values. For example, the first number of column attributes can be the number of column attributes that are explicitly identified in an update statement received from a software application system, or the total number of column attributes of the update values. In some implementations, the in-memory database computer system can identify a second total number of column attributes, a first threshold number of column attributes in the source table, a difference between the second number and the first number, and a second threshold difference in a number of column attributes. The in-memory database computer system can determine if the first number satisfies the first threshold number of column attributes, and if the difference between the second number and the first number satisfies the second threshold difference.

In general, a source table can have a large number of column attributes (e.g., >50) and the first threshold number of column attributes can be, for example, 90% (or greater) of the total number second of column attributes in the source table, or another fixed value. The second threshold difference in a number of column attributes can be a small number, for example, 2 to 5. If either the first number is less than the first threshold or that the difference is larger than the second threshold difference, or both, the in-memory database computer system can determine that the update values do not qualify for the optimized update operation. The example process 200 can proceed to 230. At 230, normal update operations can be performed in response to determining that the update values do not qualify for optimized update operation. For example, the in-memory database computer system 120 can perform the normal update operations that includes, for each row of the update values, performing dictionary compression or lookup to identify a dictionary compressed identifier of each value of each column attribute of the row, generating a new row that includes the dictionary compressed identifier of each value of each column attribute, inserting the new row into a delta table (e.g., delta table(s) 128 in FIG. 1) of the in-memory database and deleting the corresponding original row in the source table. If, at 220, the first number equals or exceeds the first threshold and the difference is less than or equal to the second threshold difference, the in-memory database computer system can determine that the update values are a candidate for the optimized update operation. The example process 200 can proceed to 302, which is further illustrated in FIG. 3.

In the example shown in FIG. 5, the in-memory database computer system 530 can identify a first number of column attributes of the update values 540 that include values updated relative to the corresponding column attributes in the source table 510 is 4, and a second total number of column attributes in the source table 510 is 4 as well. Accordingly, the difference between the first number and the second number is 0. Assume that the first threshold number of column attributes is 90% of all column attributes of the source table and the second threshold difference is 2. In this case, the first number (i.e., 4) is above the threshold number (e.g., 90%*4=3.6) and is close to the second total number (i.e., the difference between the two numbers (i.e., 0) is less than the second threshold difference 2). As such, the update values 540 are a candidate for optimized update operation.

Figure 3:
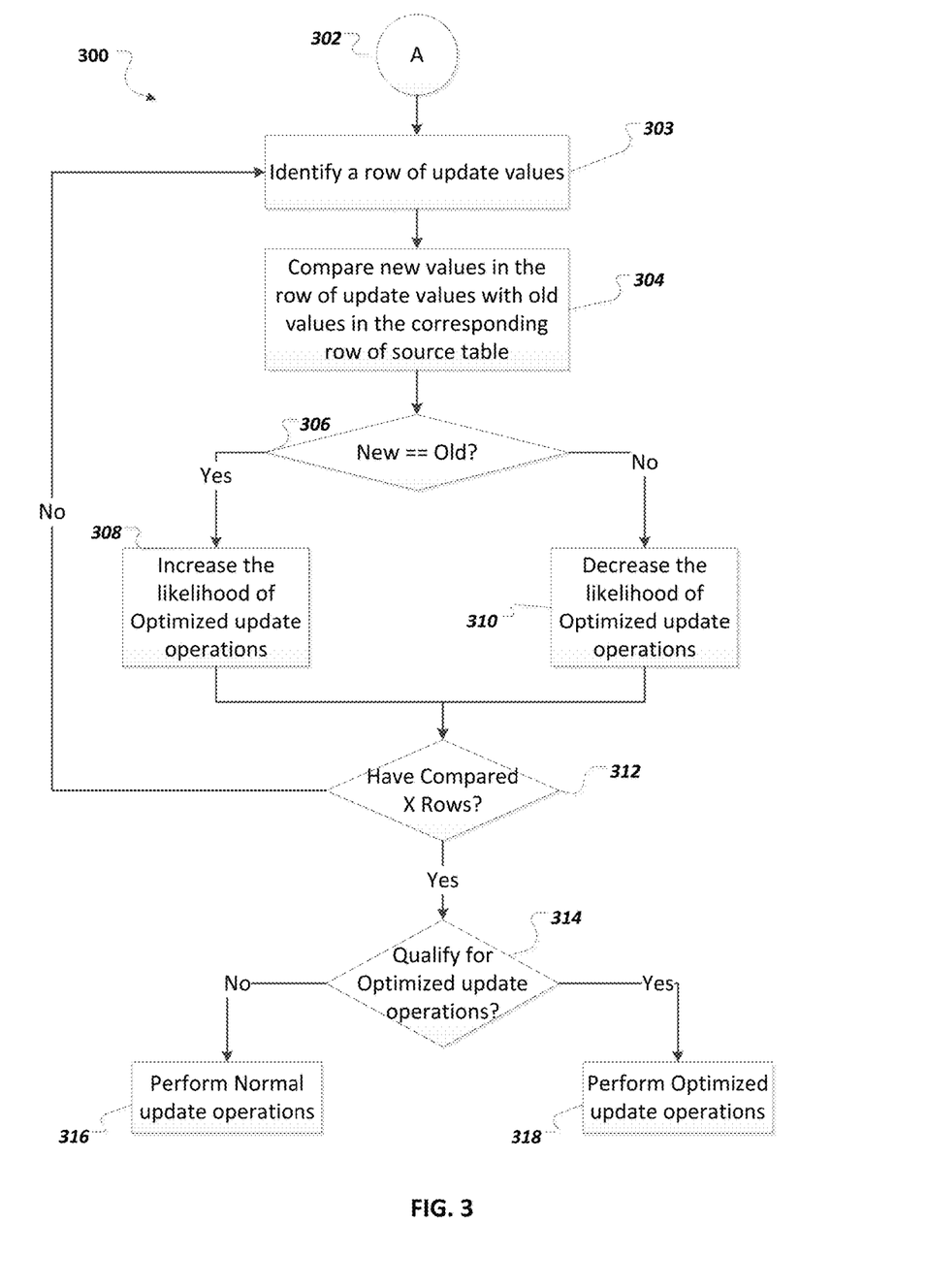
FIG. 3 is a flow chart illustrating an example method for determining whether to perform optimized update operations in in-memory database systems.

FIG. 3 is a flow chart illustrating an example process 300 for determining whether to perform optimized update operations. The process 300 can be implemented as computer instructions stored on computer-readable media (for example, the computer-readable medium 122) and executable by data processing apparatus (for example, processor(s) 124). For example, the process 300 can be implemented by the in-memory database computer systems 120 and 530 in FIGS. 1 and 5 respectively, or another computer system.

In response to determining that update values are a candidate for the optimized update operations at 220 in FIG. 2, at 302, an attribute-by-attribute comparison of a column attribute of a row of the update values with a corresponding column attribute of a corresponding row in the source table can be performed. For example, the in-memory database computer system 120 can configure a probability or likelihood for performing the optimized update operations for the update values. The likelihood can vary based on the result of the attribute-by-attribute comparison. The in-memory database computer system 120 can determine whether or not to perform optimized update operations on the update values based on the likelihood.

At 303, a row of the update values can be identified. The row can include multiple column attributes and each column attribute can have a respective value. In the example shown in FIG. 5, a first row 542 of the updated values 540 can be identified and the first row includes values z, b, c, and d for column attributes A, B, C, and D, respectively.

At 304, each value of each column attribute of the row of the update values is compared with a corresponding value of the column attribute of the row of the source table. At 306, if each value of each column attribute of the row of the update values is the same as the corresponding value of the corresponding attribute of the corresponding row of the source table, the example method 300 can proceed to 308 to increase the likelihood for performing the optimized update operation. Otherwise, the example method 300 can proceed to 310 to decrease the likelihood for performing the optimized update operation. In some implementations, the likelihood can be given an initial value, and it can be increased by a certain increment at 308 or decreased by a certain decrement at 310. In the example shown in FIG. 5, the values z, b, c, and d of the first row 542 of the updated values 540 can be compared with the values a, b, c, and d of the corresponding row 512 of the source table 510. Since the values of column attribute A in the update values 540 and in the source table 510 are different, the likelihood for performing the optimized update operations can be reduced.

In some implementations, the in-memory database computer system can apply the example operations from 303 to 310 for a threshold number of rows of the update values (e.g., X rows). The threshold number can be a constant (e.g., 5) less than the total number of rows of the update values. The threshold number can be used to ascertain whether the updated values are a good candidate for performing optimized update operation. For example, at 312, whether X rows of the update values have been compared can be checked. For example, the in-memory database computer system can determine if the attribute-by-attribute comparisons have been performed for X rows of the update values. If not, the example process 300 can go back to 303 to identify another row of the update values. For instance, the in-memory database system 530 can identify a second row 544 of the update values 540 at 303 and further compare the second row 544 with the second row 514 of the source table 510 at 304. The in-memory database system 530 can adjust the likelihood for performing the optimized update operations accordingly based on the comparison results of the rows 544 and 514.

After performing X rows of the attribute-by-attribute comparisons, the in-memory database computer system can further determine whether the update values qualify for optimized update operations at 314, for example, based on a current likelihood value after testing the X rows. For instance, the in-memory database computer system can compare the current likelihood value with a threshold likelihood value. If the current likelihood value is larger than or equal to the threshold likelihood value, the in-memory database system can determine that the update values qualify for the optimized update operations and apply the optimized update operations to the update values at 318, for example, according to the example process 400 described with respect to FIG. 4. If the current likelihood value is less than the threshold likelihood value, the in-memory database system can determine that the update values do not qualify for optimized update operations and apply the normal update operations to the update values at 316, for example, according to the example normal update operations described with respect to operation 230 of FIG. 2.

In some implementations, the X-row based test can be applied only once, for example, to the first X rows of the update values. If the first X rows of the update values fail the test (e.g., the likelihood falls below the threshold likelihood value), the in-memory database system can conclude that the entire update values do not qualify for optimized update operations and the normal update operations can be applied to all rows of the update values. In some implementations, the test of X rows can be performed from time to time. For instance, after the first X rows of the update values fail the test, the normal update operations can be performed for the next Y rows of the update values but another test of next X rows can be performed. If the next X rows succeed in the test (e.g., the likelihood stays above the threshold likelihood value), optimized update operations can be applied to some or all of the remaining rows of the update values. Different variations of the X-row based test can be performed. In some implementations, additional or different operations can be included in determining whether to perform optimized update operations.

Figure 4:
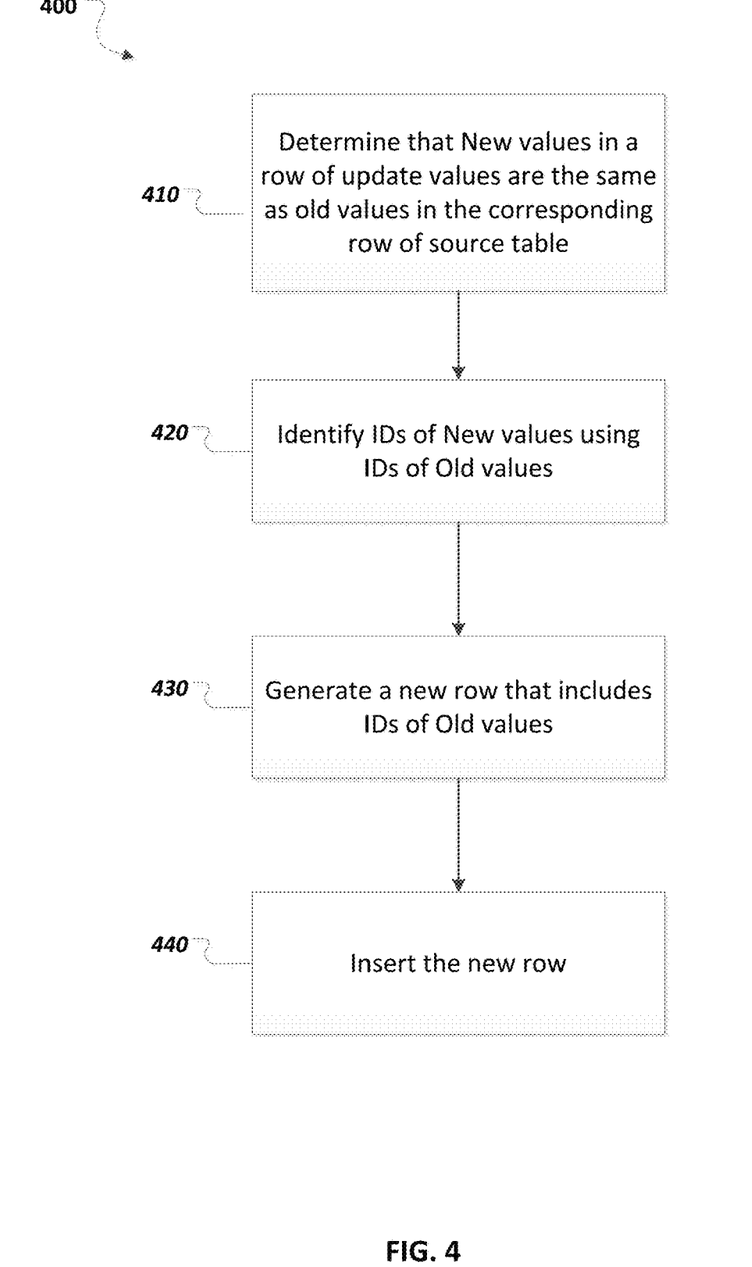
FIG. 4 is a flow chart illustrating an example method for performing optimized update operations in in-memory database systems.

FIG. 4 is a flow chart illustrating an example process 400 for performing optimized update operations in in-memory database systems. The process 400 can be implemented as computer instructions stored on computer-readable media (for example, the computer-readable medium 122) and executable by data processing apparatus (for example, processor(s) 124). For example, the process 400 can be implemented by the in-memory database computer systems 120 and 530 in FIGS. 1 and 5 respectively, or another computer system. The process 400 can be performed to update values determined to qualify the optimized operations (e.g., based on the example processes 200 and 300).

At 410, it can be determined that each value of each column attribute of a row of the update values (i.e., new value) is equal to a corresponding value of the column attribute of the row of the source table (i.e., old value). In response to such a determination, at 420, a dictionary compressed ID of each new value of the update values can be determined to be the same as a dictionary compressed ID of the corresponding old value of the source table. As such, the dictionary compressed ID that has been used in the source table can be reused for the update values. Accordingly, the costly dictionary compression and its required lookups and checks in the dictionary can be saved and the computational complexity of the optimized update operations can be significantly reduced compared with the normal update operations. At 430, a new row that includes the dictionary compressed ID of old values can be generated. In some implementations, the new row can be generated by reading the corresponding dictionary compressed IDs stored in the source table of the in-memory database, and writing the corresponding dictionary compressed IDs in the new row for the update values. At 440, the new row can be inserted into a delta table (e.g., delta table(s) 128) of the in-memory database. The corresponding row of the source table (e.g., source table(s) 126) can be subsequently deleted.

In the example shown in FIG. 5, upon the determination that the value "d" of the column attribute D of the first row 542 of the update values 540 is same as the value "d" of the column attribute D of the first row 512 of the source table 510, the in-memory database system 530 can identify the dictionary compressed ID of the value "d" (i.e., ID=1) already available from the source table and reuse it for the update values 540. For example, the in-memory database system 530 can read the dictionary compressed ID of the value "d" (i.e., ID=1) from the source table 510 and write the same ID=1 for the value "d" in a new row generated for the first row 542 of updated values 540, without looking up in a dictionary 560 to search for the dictionary compressed ID or generating a new dictionary compressed ID. The new row can be inserted into a delta table of the in-memory database of the in-memory database system 530.

In some implementations, when a value of a column attribute of a row of the update values (i.e., a new value) is different from the corresponding value of the corresponding attribute of the corresponding row of the source table (i.e., an old value), the in-memory database system can determine that the update values do not to qualify for the optimized update operations and thus apply normal update operations for this row.

For instance, in the example shown in FIG. 5, upon the determination that the value "z" of the column attribute A of the first row 542 of the update values 540 is different from the value "a" of the column attribute A of the first row 512 of the source table 510, the in-memory database system 530 can first search through the dictionary 550 for the column attribute A to see if there exists an ID for the new value "z." If no ID for the new value "z" exists, the in-memory database system can encode the new value "z" to generate a new dictionary compressed ID (e.g., ID=2) and add the new ID the dictionary 550. The in-memory database system 530 can write the new dictionary compressed ID=2 in a new row generated for the first row 542 of the update values 540, and subsequently insert the new row into a delta table of the in-memory database of the in-memory database system 530.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" can be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program can, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what can be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A computer-implemented method comprising:
identifying, by an in-memory database computer system based on information from a computer system implementing a software application, update values corresponding to a source table of values stored on an in-memory database, the update values distributed across a plurality of rows, each row including a plurality of column attributes, at least some column attributes of the plurality of column attributes including values updated relative to corresponding column attributes in the source table of values;
identifying, by the in-memory database computer system, a row of the update values, the row including a plurality of column attributes, each column attribute having a respective value, and wherein the row of the update values is a first row of the update values;
determining, by the in-memory database computer system, that each value of each column attribute of the row of the update values is the same as a corresponding value of a corresponding attribute of a corresponding row of the source table, wherein the corresponding row in the source table is a corresponding first row in the source table;
in response to determining that a value of the column attribute of a second row of the update values is different from a corresponding value of a corresponding attribute of a corresponding second row of the source table, decreasing a likelihood for performing optimized update operations; and
writing, by the in-memory database computer system, a corresponding row of the source table stored on the in-memory database into the in-memory database in response to determining that each value of each column attribute of the row of the update values is the same as the corresponding value of the corresponding attribute of the corresponding row of the source table and that a likelihood for performing the optimized update operations exceeds a threshold likelihood value, wherein writing the corresponding row of the source table to the in-memory database comprises performing optimized update operations, the optimized update operations comprising:
determining, by the in-memory database computer system, a dictionary compressed identifier of each value of each column attribute of the row of the update values to be the same as a dictionary compressed identifier of the corresponding value of the corresponding attribute of the corresponding row of the source table;
generating a new row that includes the dictionary compressed identifier of each value of each column attribute in the corresponding row of the source table; and
inserting the new row into a delta table of the in-memory database.

2. The method of claim 1, further comprising, in response to determining that each value of each column attribute of the row of the update values is the same as the corresponding value of the corresponding attribute of the corresponding row of the source table, increasing a likelihood for performing the optimized update operation.

3. The method of claim 1, wherein the method further comprises, for each of a threshold number of rows of the update values, the threshold number being less than a total number of rows of the update values:
determining that a value of a column attribute of a respective row of the update values is different from a corresponding value of a corresponding attribute of a corresponding respective row of the source table; and
in response to determining that the value of the column attribute of the respective row of the update values is different from the corresponding value of the corresponding attribute of the corresponding respective row of the source table, determining that the update values do not qualify for performing the optimized update operation.

4. The method of claim 3, further comprising, in response to determining that the update values do not qualify for performing the optimized update operation:
performing dictionary compression or lookup to identify a dictionary compressed identifier of each value of each column attribute of the row of the update values;
generating a new row that includes the dictionary compressed identifier of each value of each column attribute; and
inserting the new row into a delta table of the in-memory database.

5. The method of claim 3, wherein the threshold number of rows is five rows.

6. The method of claim 1, further comprising determining that the update values qualify for the optimized update operation, wherein determining that the update values qualify for the optimized update operations comprises:
identifying a first number of column attributes of the update values that include values updated relative to the corresponding column attributes in the source table of values;
identifying a second total number of column attributes in the source table;
determining that the first number satisfies a first threshold number of column attributes; and
determining that a difference between the second number and the first number satisfies a second threshold difference in a number of column attributes.

7. A non-transitory computer-readable medium storing instructions executable by an in-memory database computer system to perform operations comprising:
identifying, by an in-memory database computer system based on information from a computer system implementing a software application, update values corresponding to a source table of values stored on an in-memory database, the update values distributed across a plurality of rows, each row including a plurality of column attributes, at least some column attributes of the plurality of column attributes including values updated relative to corresponding column attributes in the source table of values;
identifying, by the in-memory database computer system, a row of the update values, the row including a plurality of column attributes, each column attribute having a respective value, and wherein the row of the update values is a first row of the update values;
determining, by the in-memory database computer system, that each value of each column attribute of the row of the update values is the same as a corresponding value of a corresponding attribute of a corresponding row of the source table, wherein the corresponding row in the source table is a corresponding first row in the source table;
in response to determining that a value of the column attribute of a second row of the update values is different from a corresponding value of a corresponding attribute of a corresponding second row of the source table, decreasing a likelihood for performing optimized update operation; and
writing, by the in-memory database computer system, a corresponding row of the source table stored on the in-memory database into the in-memory database in response to determining that each value of each column attribute of the row of the update values is the same as the corresponding value of the corresponding attribute of the corresponding row of the source table and that a likelihood for performing the optimized update operation exceeds a threshold likelihood value, wherein writing the corresponding row of the source table to the in-memory database comprises performing optimized update operations, the optimized update operations comprising:
determining, by the in-memory database computer system, a dictionary compressed identifier of each value of each column attribute of the row of the update values to be the same as a dictionary compressed identifier of the corresponding value of the corresponding attribute of the corresponding row of the source table;
generating a new row that includes the dictionary compressed identifier of each value of each column attribute in the corresponding row of the source table; and
inserting the new row into a delta table of the in-memory database.

8. The medium of claim 7, the operations further comprising, in response to determining that each value of each column attribute of the row of the update values is the same as the corresponding value of the corresponding attribute of the corresponding row of the source table, increasing a likelihood for performing the optimized update operation.

9. The medium of claim 7, the operations further comprising, for each of a threshold number of rows of the update values, the threshold number being less than a total number of rows of the update values:
determining that a value of a column attribute of a respective row of the update values is different from a corresponding value of a corresponding attribute of a corresponding respective row of the source table; and
in response to determining that the value of the column attribute of the respective row of the update values is different from the corresponding value of the corresponding attribute of the corresponding respective row of the source table, determining that the update values do not qualify for performing the optimized update operation.

10. The medium of claim 9, the operations further comprising, in response to determining that the update values do not qualify for performing the optimized update operation:
performing dictionary compression or lookup to identify a dictionary compressed identifier of each value of each column attribute of the row of the update values;
generating a new row that includes the dictionary compressed identifier of each value of each column attribute; and
inserting the new row into a delta table of the in-memory database.

11. The medium of claim 10, the operations further comprising determining that the update values qualify for the optimized update operation, wherein determining that the update values qualify for the optimized update operations comprises:
identifying a first number of column attributes of the update values that include values updated relative to the corresponding column attributes in the source table of values;
identifying a second total number of column attributes in the source table;
determining that the first number satisfies a first threshold number of column attributes; and
determining that a difference between the second number and the first number satisfies a second threshold difference in a number of column attributes.

12. A system comprising:
at least one processor;
a non-transitory computer-readable storage medium coupled to the at least one processor and storing an in-memory database and programming instructions for execution by the at least one processor, wherein the programming instructions instruct the at least one processor to:
identifying, by an in-memory database computer system based on information from a computer system implementing a software application, update values corresponding to a source table of values stored on an in-memory database, the update values distributed across a plurality of rows, each row including a plurality of column attributes, at least some column attributes of the plurality of column attributes including values updated relative to corresponding column attributes in the source table of values;
identifying, by the in-memory database computer system, a row of the update values, the row including a plurality of column attributes, each column attribute having a respective value, and wherein the row of the update values is a first row of the update values;
determining, by the in-memory database computer system, that each value of each column attribute of the row of the update values is the same as a corresponding value of a corresponding attribute of a corresponding row of the source table, wherein the corresponding row in the source table is a corresponding first row in the source table;
in response to determining that a value of the column attribute of a second row of the update values is different from a corresponding value of a corresponding attribute of a corresponding second row of the source table, decreasing a likelihood for performing optimized update operation; and
writing, by the in-memory database computer system, a corresponding row of the source table stored on the in-memory database into the in-memory database in response to determining that each value of each column attribute of the row of the update values is the same as the corresponding value of the corresponding attribute of the corresponding row of the source table and that a likelihood for performing the optimized update operation exceeds a threshold likelihood value, wherein writing the corresponding row of the source table to the in-memory database comprises performing optimized update operations, the optimized update operations comprising:
determining, by the in-memory database computer system, a dictionary compressed identifier of each value of each column attribute of the row of the update values to be the same as a dictionary compressed identifier of the corresponding value of the corresponding attribute of the corresponding row of the source table;

generating a new row that includes the dictionary compressed identifier of each value of each column attribute in the corresponding row of the source table; and inserting the new row into a delta table of the in-memory database.

13. The system of claim 12, the programming instructions instructing the at least one processor to, in response to determining that each value of each column attribute of the row of the update values is the same as the corresponding value of the corresponding attribute of the corresponding row of the source table, increase a likelihood for performing the optimized update operation.

14. The system of claim 12, the programming instructions instructing the at least one processor to, for each of a threshold number of rows of the update values, the threshold number being less than a total number of rows of the update values:

determine that a value of a column attribute of a respective row of the update values is different from a corresponding value of a corresponding attribute of a corresponding respective row of the source table; and in response to determining that the value of the column attribute of the respective row of the update values is different from the corresponding value of the corresponding attribute of the corresponding respective row of the source table, determine that the update values do not qualify for performing the optimized update operation.

15. The system of claim 14, the programming instructions instructing the at least one processor to, in response to determining that the update values do not qualify for performing the optimized update operation:

perform dictionary compression or lookup to identify a dictionary compressed identifier of each value of each column attribute of the row of the update values;

generate a new row that includes the dictionary compressed identifier of each value of each column attribute; and insert the new row into a delta table of the in-memory database.

16. The system of claim 12, wherein writing dictionary compressed identifiers of the corresponding row of the source table to the in-memory database comprises writing dictionary compressed identifiers of the corresponding row of the source table to the in-memory database instead of performing dictionary compression or lookup of each value of each column attribute of the row of the update values.

* * * * *